United States Patent [19]

Kondo et al.

[11] Patent Number: 4,659,914

[45] Date of Patent: Apr. 21, 1987

[54] MAGNETIC CARD DISCRIMINATOR

[75] Inventors: Hiroatsu Kondo; Yasukiyo Yamamoto, both of Toyonaka, Japan

[73] Assignee: I. M. Electronics Co., Ltd., Osaka, Japan

[21] Appl. No.: 755,662

[22] Filed: Jul. 16, 1985

[30] Foreign Application Priority Data

Mar. 11, 1985 [JP] Japan .................................. 60-49159
Mar. 11, 1985 [JP] Japan .................................. 60-49160
Mar. 11, 1985 [JP] Japan ............................ 60-35169[U]

[51] Int. Cl.[4] ............................................ G06K 5/00
[52] U.S. Cl. ................................... 235/380; 235/379; 235/449
[58] Field of Search ....................... 235/379, 380, 449

[56] References Cited

U.S. PATENT DOCUMENTS

3,996,450  12/1976  Kerkhofr ............................ 235/380

Primary Examiner—Harold I. Pitts
Attorney, Agent, or Firm—Birch, Stewart, Kolasch & Birch

[57] ABSTRACT

A magnetic card discriminator which is equipped with a card reading part, a registration number memory part, an invalid number memory part, a processing part, and an alarm, and which discriminates whether a card registration number magnetically recorded on a magnetic card is an invalid registration number or not; wherein the card reading part reads the card registration number, the registration number memory part stores the foregoing card registration number having been read, the invalid number memory part has previously stored an invalid registration number of a magnetic card not to be used, the processing part compares the coincidence and non-coincidence of the card registration number having been read out from the registration number memory part with the invalid registration number, and actuates the alarm on the basis of the result of the above comparison such as, for example, the coincidence, and then the alarm makes an alarm signal in the combination of, for example, sound and light.

7 Claims, 10 Drawing Figures

MAGNETIC CARD DISCRIMINATOR

BACKGROUND OF THE INVENTION

There are generally used various kinds of cards such as bank cards being used for the automatic withdrawal of cash from banks, credit cards being used in the credit sale transactions, or ID cards being used for the identification of individuals who enter normally restricted zones or buildings or rooms.

By way of such kinds of cards, there are usually made use of magnetic cards being provided with a magnetic registration field in the form of a magnetic stripe. In these magnetic registration fields, there are stored card registration numbers. However, the use of such cards is stopped for various reasons such as missing or stolen cards or bad payment on the card account. Taking case of the credit cards, in stores or restaurants where the cards are used, validity checking has been made so far by comparing a list of invalid registration numbers against the card registration number visually displayed on the magnetic card being used, so that not only is time and labor required but also some invalid numbers may be left unnoticed while on the other hand this method is sometimes capable of giving customers a somewhat unpleasant feeling. In addition to these circumstances, even though a reference check for the registration number is in some cases made to the credit company by taking advantage of the terminal equipment being connected to a host computer, employment of this practice is not popular because of place and time restrictions and considerable expense, and as a result the card registration number being recorded magnetically is not made use of with efficiency.

THE SUMMARY OF THE INVENTION

It is an object of this invention is to provide a magnetic card discriminator being able to easily and quickly determine a magnetic card not to be used.

Another object of this invention is to provide a magnetic card discriminator having the ability to function independently without being connected to the host computer of, for example, a credit company where the invalid registration number in question is recorded.

A further object of this invention is to provide a magnetic card discriminator which can be made into a small-sized and portable unit.

BRIEF DESCRIPTION OF THE DRAWINGS

FIGS. 7(1), 7(2) to 9 are flow charts showing the operation of the invention.

DETAILED DESCRIPTION

Description will be now directed to an example of this invention with reference to the accompanying drawings.

In the figures, the magnetic card discriminator 1 is equipped with a card reading part 3 reading a card registration number NA which is magnetically recorded on a magnetic card MC, a registration number memory part 10 storing the above-mentioned card registration number NA which has been read, an invalid number memory part 11 having been made to previously store an invalid registration number NB, a processing part 7 fetching the card registration number NA from the above-mentioned registration number memory part 10, comparing it with the above-mentioned invalid registration number NB, and outputting the coincidence and non-coincidence of the two (NA and NB), and lastly an alarm 9 being able to work in response to the above-mentioned output of the processing part 7.

Figure 3:
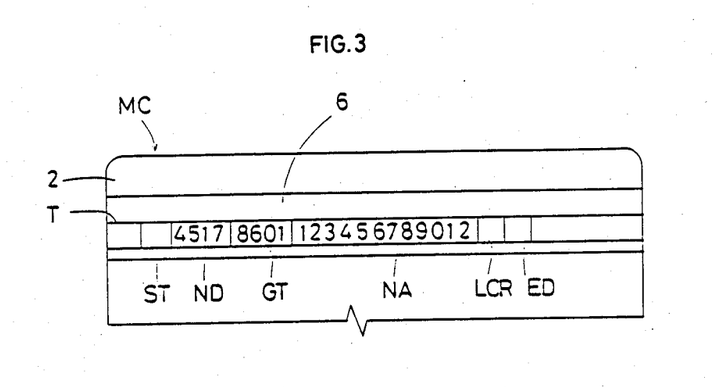
FIG. 3 is a diagrammatic view showing a recorded state of the magnetic record field of the magnetic card.

The magnetic card MC is in its card substrate 2 with a visual display field 4 where the card registration number NA is displayed and with a magnetic record field 6. On this magnetic reccord field 6 as shown in FIG. 3, both the above-mentioned card registration number NA and a converted password number ND obtained, in this example, by conversion of, the card password number NC are magnetically recorded.

Incidentally, the above-mentioned card password number NC can be also recorded on the magnetic record field 6 as it is without making any conversion.

The above-mentioned card substrate 2 is made of synthetic resin and takes the form of a sideways rectangular visiting card while integrally laminating several sheets consisting of vinyl chloride polymer, copolymer of vinyl chloride and vinyl acetate, etc., etc. In any case, it is made by using such materials as having the fitness for what is called an embossing treatment which makes possible to express letters by means of the uneven deformation. In this way, it is on the surface of such a card substrate 2 as mentioned above that the visual display field 4 and the magnetic record field 6 are provided for.

The visual display field 4 is, in this example, formed of a rectangular area occupying the nearly lower half part of the surface of the card substrate 2, on the upper part of which the card registration number NA "1 2 3 4 5 6 7 8 9 0 1 2" consisting of the identification number "1234" of an organization issuing that magnetic card MC, for example, a credit company and the registration number, for example, "5 6 7 8 9 0 1 2" of the card being present in the organization is displayed, for example, as "1234-5678-9012" by the embossed letters coming out from the surface of that card substrate 2 which has undergone the embossing treatment. On the other hand, beneath the above-mentioned card registration number NA near the bottom side thereof, the full name NM of the user (owner) of the magnetic card MC is displayed as, for example "YAMAMOTO", and the time limit of availability GT, for example, January, 1986 is displayed as "86-1".

The magnetic record field 6, which consists of what is called a magnetic stripe being able to be magnetically recoorded upon, is provided on the upper end part of the surface of the card substrate 2 in the longitudinal direction along the full length thereof. The magnetic record field 6 is further provided with a track T on which the information can be serially recorded. As shown in FIG. 3, there are recorded on the very track T the above-mentioned card registration number NA, the time limit of availability GT, and further the converted password number ND being obtained, in this example, by making the card password number NC backwards convertible and by being converted so as to differ from the card password number NC according to the hereinafter described procedure, while using by way of example the standard code such as 7 unit codes being stipulated in the Japanese Industrial Standard (JIS) C 6220 (Code for information interchange) and being based on the frequency modulation system. By the way, out of the remaining three (3) abbreviations in the present figure, LCD is a code for parity check, ST is a code for start, and ED is a code for stop.

In this connection, it is possible to apply the standards of the Japanese Industrial Standards (JIS) B 9560 correspondingly to the above-mentioned card substrate 2, the visual display field 4, and the magnetic record field 6, and it is also possible to apply the standard of the Japanese Industrial Standards (JIS) B 9561 correspondingly to the magnetic recording format of the magnetic record field 6.

Figure 4:
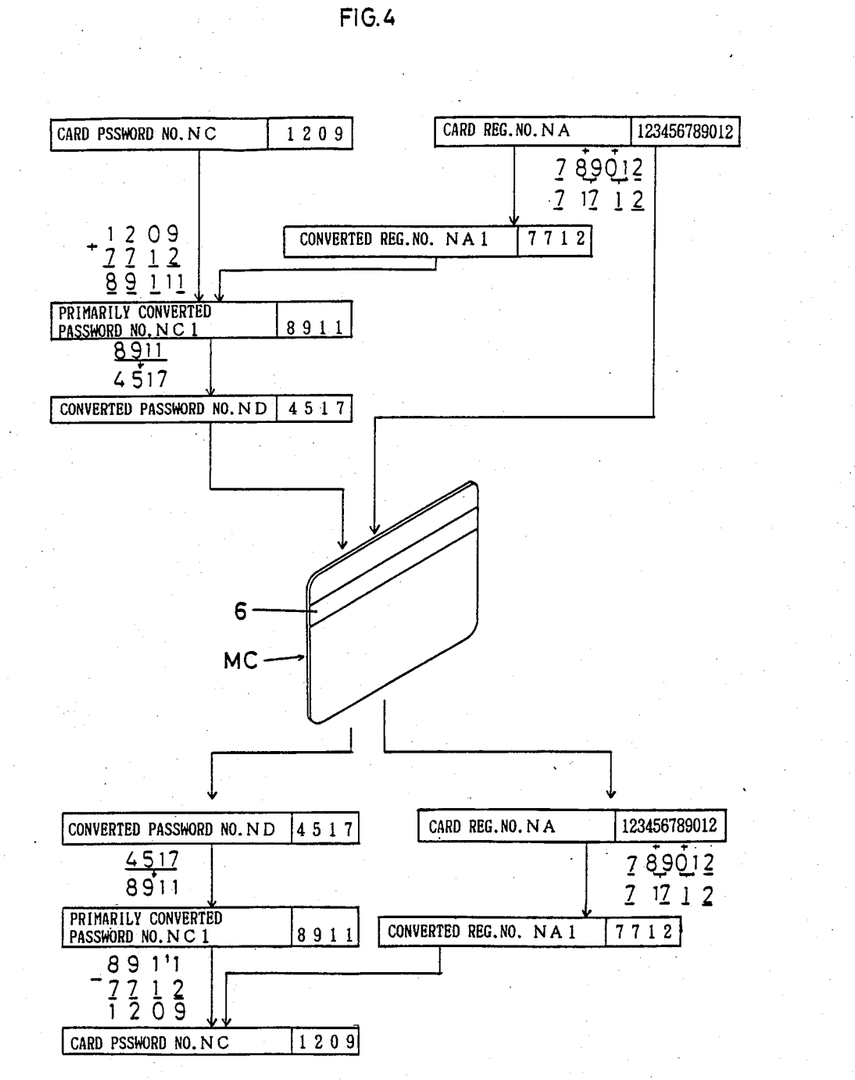
FIG. 4 is an explanatory diagram showing the stage of converting the card password number and also the stage of the backward conversion thereof.

Description will be now directed to the password number converting system converting the card password number NC into the converted password number ND, and to the password number backward converted system performing the backward conversion, with reference to FIG. 4.

In this example, the password number converting system converts the card password number NC into the converted password number ND being different from the above-mentioned card password number NC after once conventionally converting the card password number NC into the primarily converted password number NC1 by the use of the converted registration number NA1 obtained by limiting the number of digits of the card registration number NA, and further by innovatively converting that primarily converted password number NC1.

Description will be now directed to an example taking the case where the card registration number NA is, for example, "1 2 3 4 5 6 7 8 9 0 1 2", and the card password number NC is, for example, "1209".

The converted registration number NA1 is conventionally converted through the calculation into the number of 4 figures "7712", out of which the first "7" is the number of the 6th figure "7" as it is of the number of lower 6 figures "789012" of the card registration number NA, the second "7" is the number of the lower 1 figure of the sum "17" of the number of the 5th and 4th figures "89", the third "1" is the number of the lower 1 figure of the sum "1" of the number of the 3rd and 2nd figures "01", and the fourth 2 is the number of the 1st figure "2" as it is.

The primarily converted password number NC1 is conventionally converted through the calculation into the number of 4 figures "8911" consisting of the respective lower 1 figures of each sum (8), (9), (1), (11) of the corresponding number of the 4th to 1st figures of both the number of 4 figures "1209" of the card password number NC and the number of 4 figures "7712" of the above-mentioned converted registration number NA1.

In non-conventionally converting the above-mentioned primarily converted password number NC1 "8911" into the converted password number ND, this converted password number ND is converted into "4517" being different from "1209" of the card password number NC by using, in this example, the conversion table EX which is irregular like a table of random numbers but corresponding in 1 to 1 and backward-convertible.

The converted password number ND and the card registration number NA are both magnetically recorded on the magnetic record field 6 of the magnetic card MC, as described before.

After the converted password number ND "4517" having been read from the magnetic card MC is converted backward into the above-mentioned primarily converted password number NC1 "8911" by using the above-mentioned conversion table EX, the converted password number ND is converted backward into the card password number NC "1209", that is, the number of 4 figures produced by subtracting each digit of the above-mentioned converted registration number NA1 "7712" obtained by converting the similarly read-out card registration number NA from each number of the 4th to 1st figures of the above-mentioned primarily converted password number NC1 "8911". In case the converted password number ND is different from the card password number NC and is not possible easily to interpret, then it may be permitted to apply any other conversion system.

Figure 1:
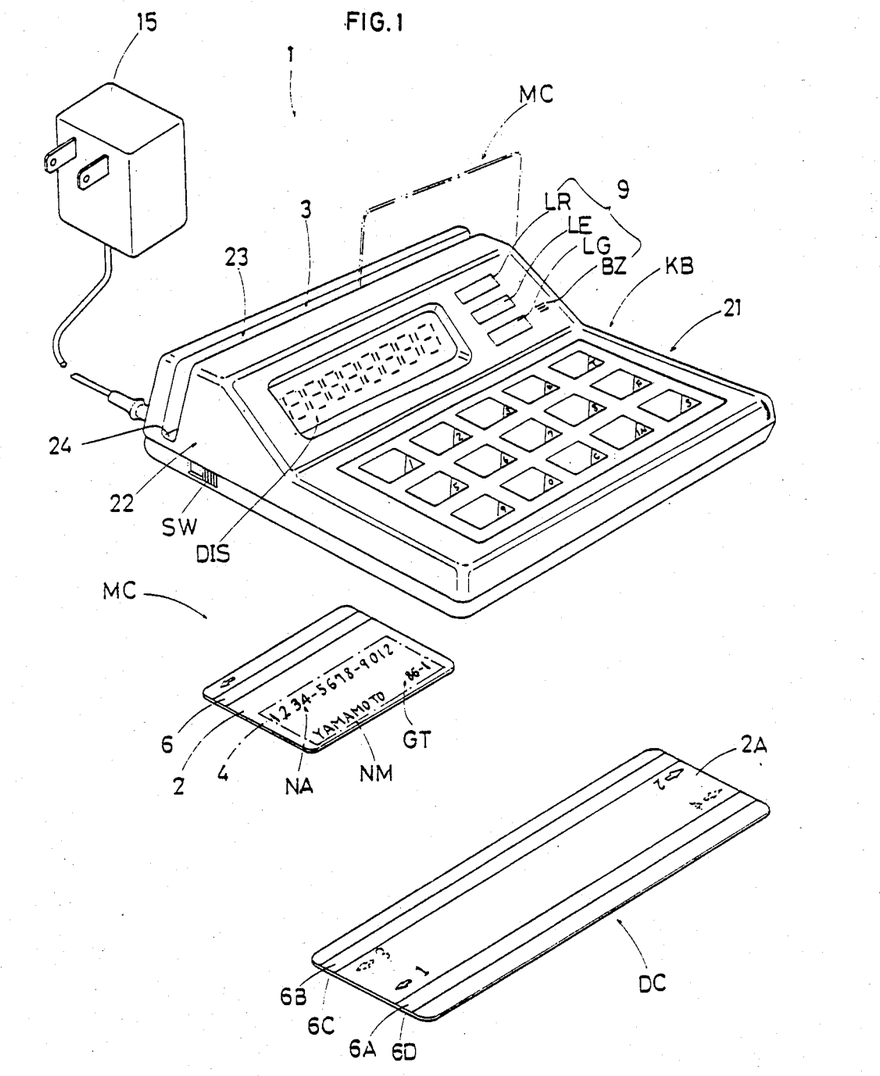
FIG. 1 is a perspective view showing an example of this invention.
Figure 2:
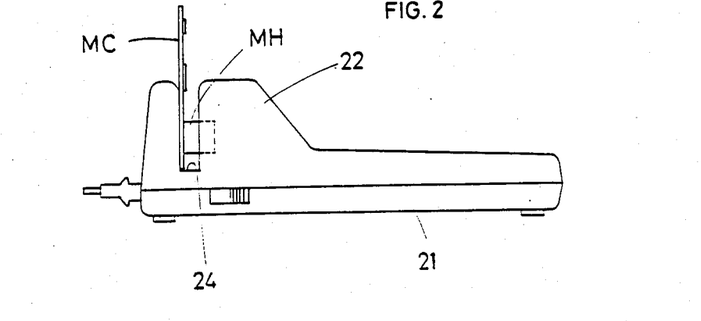
FIG. 2 is a side view of FIG. 1.

The previously described card reading part 3 in this example is made by laying a magnetic head MH within a card passing-through slot 23 provided at a bulging-out part 22 being formed at the rear end part of a flat box-shaped substrate 21. Both ends of the card passing-through slot 23 are open at the both side faces of the bulging-out part 22, and the upper end of it is open at the top face of the latter, wherefore the magnetic card MC can be inserted thereinto while impinging its top edge against the bottom face 24 of the slot and being turned reversely from top to bottom. At this time, although the lower part of the magnetic card MC protrudes over the top end of the card passing-through slot 23, the magnetic record field 6 can be allowed to fit right with the height of the magnetic head MH. In this way, it becomes possible tohold the above-mentioned protruding part of the magnetic card MC with the hand and thereby to make the magnetic card MC pass before the magnetic head by hand-feeding, whereby the magnetic head MH can read the information magnetically recorded on the magnetic record field 6. It is also possible to arrange within the card passing-through slot 23 a driving roller for automatically feeding the magnetic card MC.

On the other hand, an input keyboard KB is provided on the surface of the substrate 21, while a display part DIS and an alarm 9 are furnished on the inclined front face of the bulging-out part 22.

The input keyboard KB is provided with ten keys inscribed with the figures "0" to "9", a clear key C and a registration key IN both inscribed with "C" and "IN", respectively, a time display key T and a function key F each inscribed individually with "T" and "F", and a start key S inscribed with "S".

The display part DIS consists of a fluorescent tube, a liquid crystal tube and others respectively segmented in seven regions and has the ability to display the maximum number of figures on the above-mentioned card registration number NA and the like requiring to display.

The alarm 9 is provided with lamps LR, LE, LG having light emitting diodes of, for example, red, yellow, and green colors, and a sound-emitting unit BZ consisting of what is called an electronic buzzer.

Figure 5:
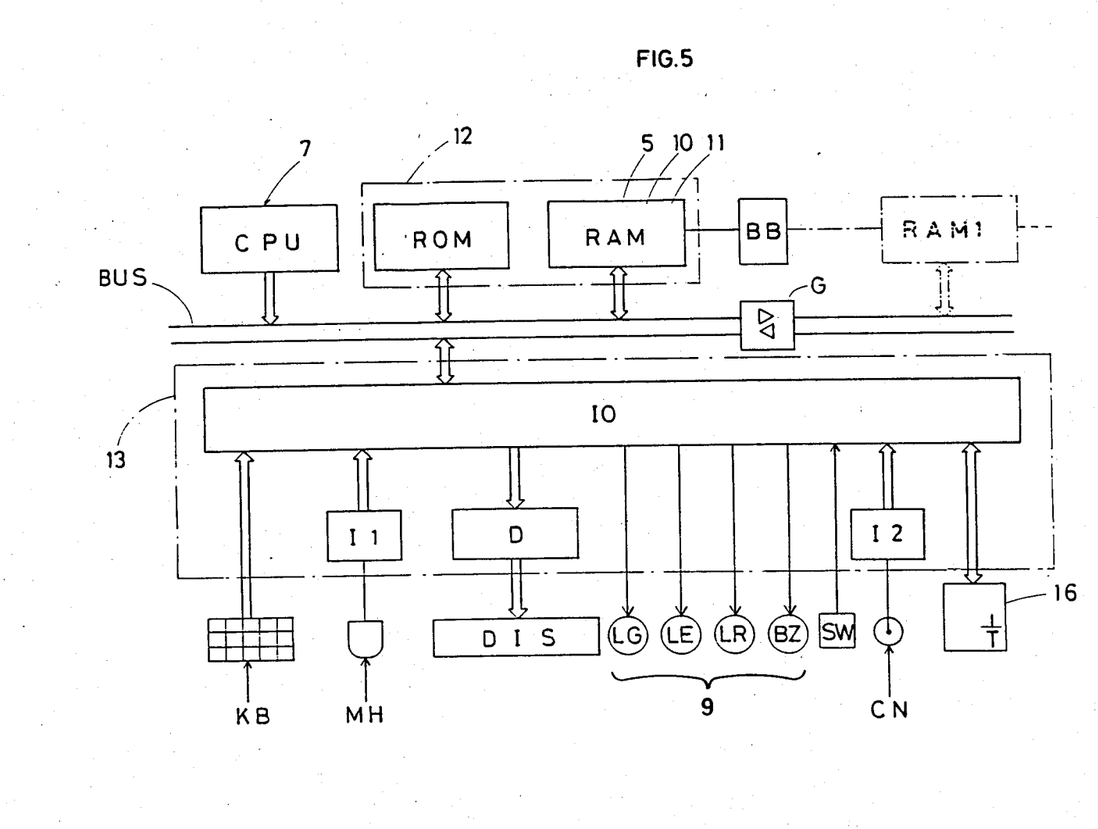
FIG. 5 is a block diagram showing an example of the electric circuits of the invention.

The above-mentioned magnetic head MH, the input key KB and the display part DIS together constitute an electric circuit as shown in the block diagram of FIG. 5.

This electric circuit is provided with a processing part 7 made up of procesor CPU, a memory part 12 consisting of ROM and RAM, and an input/output part 13. Each of these component units is interconnected by means of a data bus BUS, a control bus, and an address bus (both of busses not shown) and works pursuant to the procedure prescribed on the basis of the program previously stored in the above-mentioned memory part 12.

In the storage area of RAM, there are provided an invalid number memory part 11 being made to previously store invalid registration numbers NB which are registration numbers of the cards not to be used, a registration number memory part 10 storing the card registration number NA which has been read by the above-mentioned card reading part 3, and a converted password number memory part 5 storing the converted password number ND.

The above-mentioned RAM holds the contents of memory for a comparatively long period of time, for example, for one month, even when the power source is in the OFF condition, with the aid of a back-up power source BB being composed of, for example, a battery which can be recharged. By the way, the above-mentioned back-up power source BB is charged while being connected to a battery which is incorporated within the above-mentioned substrate 21 or an AC adapter 15.

The above-mentioned input/output part 13 is provided with an input-output interface I0 having an input-/output port which is controllable by the control signal from the processing part 7, an interface I1 for connecting the magnetic head MH which is connected to the above-mentioned port, a driver D connecting the above-mentioned display part DIS, and a cassette interface I2.

The above-mentioned input key KB, each of lamps LR, LE, LG and the sound-emitting unit BZ of the alarm 9, a mode change-over switch SW, and the clock part 16 are all connected to the above-mentioned port of the above-mentioned input-output interface I0. Further, the magnetic head MH is connected to the interface I1, the display part DIS to the driver D, and an input-output terminal CN to the cassette interface I2, respectively.

The interface I1 amplifies the output of the magnetic head MH and shapes the waveform thereof and converts it into parallel data. In order to dynamically display the data being output from the input-output interface 10, the driver D outputs it together with a digit change-over signal. As for the cassette interface I2, it comprises a modulator-demodulator. The clock part 16 is able to output the time data representing "year, month, day, hour, minute, second" toward the input-/output part 13 by the use of the control signal being output from the processing part 7, and also to correct that time data by the use of the correction signal being output from that input-output part 13. By the way, this clock part 16 has an exclusive power source, thereby being able to work for a long period of time, for example, one to several years.

Incidentally, in this example, the above-mentioned processing part 7, the memory part 12, and the input-/output part 13 are formed together on one chip to construct a one touch microcomputer of a C-MOS type. In this connection, the above-mentioned data bus BUS is pulled out through the gate G being formed on the above-mentioned chip so as to be able to connect RAM 1 for increasing external memory capacity.

Figure 6:
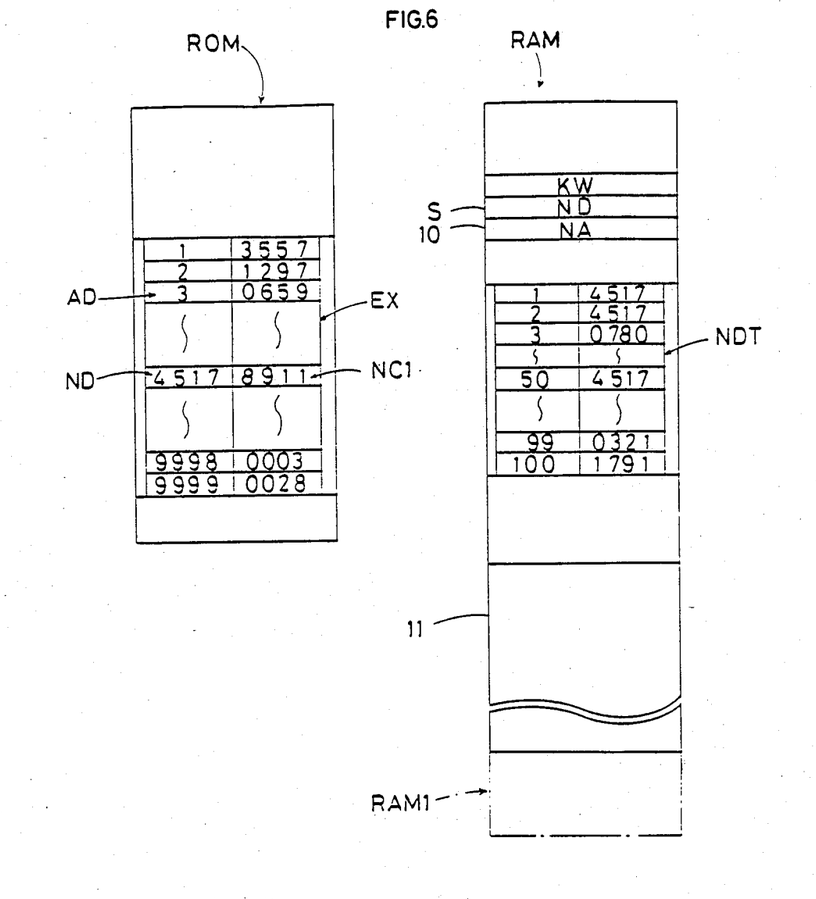
FIG. 6 is a diagram showing a state of allocation of the memory part thereof.
Figure 7:
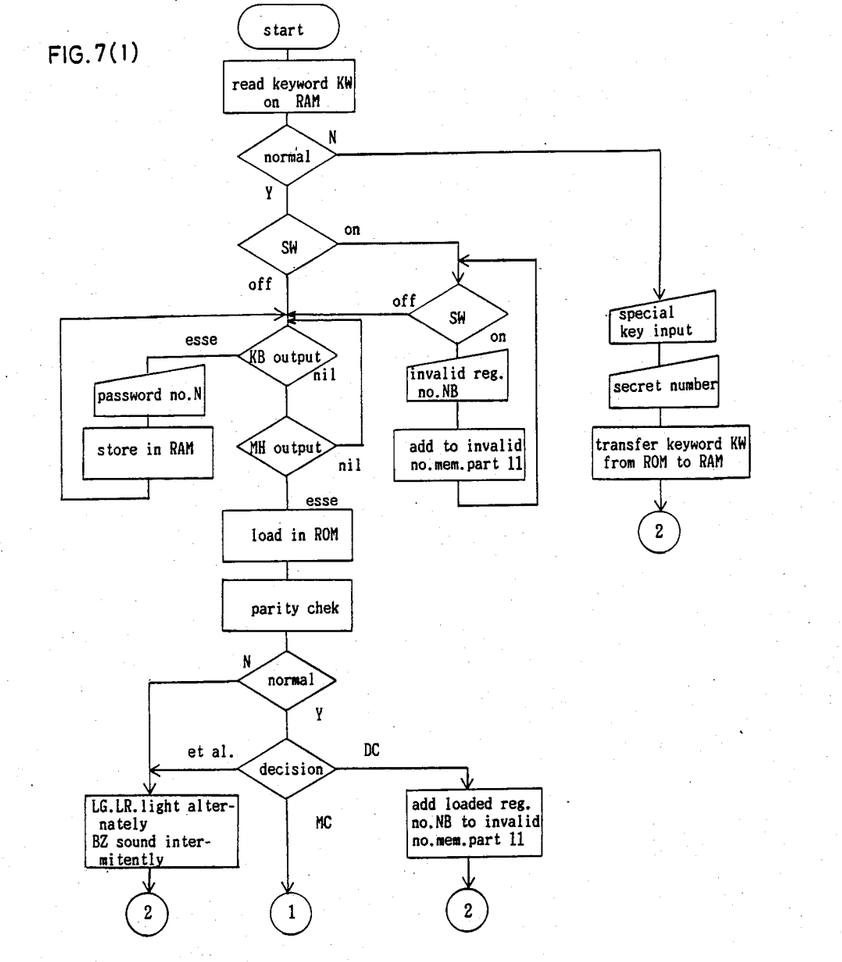

Description will be now made of the behavior of the electric circuit thus constructed with reference to FIGS. 5 to 9:

As a start, by closing the power source switch (not shown) provided at the back face of the substrate 21, power is supplied to the above-mentioned processing part 7, the memory part 12, and the input-output part 13. After having initialized the register, the working area of RAM, and others pursuant to the program written in ROM, the processing part 7 waits for the input from the input keyboard KB, and, when the start key S is in the ON state, reads the keyword KW previously stored in RAM as shown in FIG. 6, and, when the proper keyword is present, checks "ON" and "OFF" of the mode change-over switch SW. Further, the processing part 7 detects the outputs of both the input keyboard KB and the magnetic head MH, for example, by means of scanning when the mode change-over switch SW is off, and stores, when there is an output from the input keyboard KB, the very output in RAM as a password number. When there is an output from the magnetic head MH, the processing part 7 once loads the very output into the working area of RAM and does a parity check of it, and, when its result is normal, identifies the species of the card. When there is found any abnormality in the above-mentioned parity check or the identification of the card, then the green lamp LG and the red lamp LR of the alarm 9 go on and off alternately, and the sound-emitting unit BZ operates intermittently to emit the alarm signal.

In identifying the species of card, the expiration date is also checked. The check of the expiration date is performed by comparing which is larger, "8601" representing the expiration date GT being loaded, as mentioned above, in the working area of RAM or "8503" representing the year and month at the present time which the clock part 16 outputs, for example, "March, 1985", and by deciding whether it is within the time limit or not. In the case of being out of the time limit, the red lamp LR lights, and the sound-emitting unit BZ operates continuously and emits the alarm signal. On the contrary, in the case of being within the time limit, the check of both the card registration number NA and the invalid registration number NB is then conducted. The card registration number NA is fetched from the above-mentioned registration number memory part 10 by the processing part 7, and is compared with the invalid registration number NB—of the invalid number memory part 11. When the invalid registration number NB coinciding with the card registration number NA is found in the invalid registration number memory part 11, the processing part 7 outputs the lighting signal to light the yellow lamp LE of the alarm 9, thereby activating the above-mentioned lamp LE. Further, the processing part 7 flashes that card registration number NA on the display part DIS, but, when being valid, the card registration number NA is continuously displayed.

Next, when the password number N on RAM which has been read is null, it is decided that the password number N has been not input, in keeping with which the power source is put in the OFF condition after having let the above-mentioned display and the alarm signal continue for a few minutes On the contrary, when the password number N has been input by the input keyboard KB, the hereinafter described check is made by comparing that password number N with the card password number NC obtained by converting backward the converted password number ND which has been recorded on the magnetic record field 6 of the magnetic card MC. As a result, when the password number N coincides with the card password number NC, then the green lamp LG of the alarm 9 is lighted, but when they do not coincide with each other, then the red lamp LR of the alarm 9 is lighted, and also the sound-emitting unit BZ operates continuously to give the alarm signal, at the same time when the program for preventing the backward read of the password number is put in practice.

Figure 8:
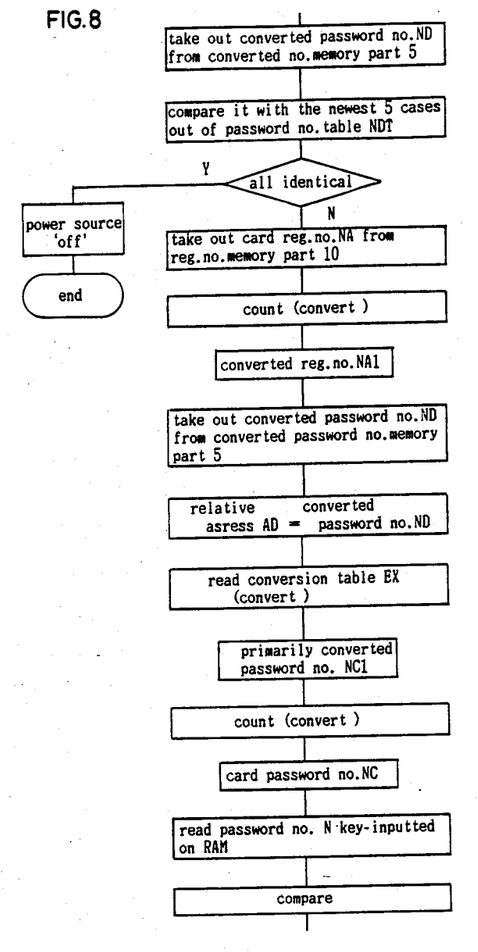

Description will be now directed to the operation of the checking of the above-mentioned password number with reference to FIG. 8. Incidentally, in this operation, there are used the password number table NDT being stored in the area of RAM of the memory part 12 and the above-mentioned conversion table EX being previously stored within ROM as shown in FIG. 6.

The password number table NDT stores, in cooperation with the program for preventing the backward read of the password number, the converted password number ND in order of occurrence when the pass word number N has been input from the input keyboard KB and it has been decided that the card registration number NA does not coincide there with, wherein the converted password number ND1 to ND100 of, for example, from the newest one up to the greatest number of 100 cases are stored.

On the other hand, the conversion table EX, which has been formerly used for backward-converting the converted password number ND into the primarily converted password number NC1 at the time of checking the magnetic card MC, stores the primarily converted password number NC1 in the capacity of the data of each corresponding relative address AD while treating the converted password number ND as a relative address AD. Therefore, the primarily converted password number NC1 can be obtained by reading this conversion table EX while treating the converted password number ND as the relative address AD.

The processing part 7 fetches the converted password number ND from the converted password number memory part 5 into the processing part 7 itself, and compares it with the newest 5 cases ND1–ND5 being stored in the above-mentioned password number table NDT. As a result, when all of the above-mentioned newest 5 cases are identical with the converted password number ND, then the processing part 7 puts the power source "off", and stops its function. Accordingly, when the password number N has been erroneously input continuously 5 times, the operation stops, but when the mistakes are less than that, the operation is continued.

Next, the processing part 7 fetches the card registration number NA from the registration numbers memory part 10 into the processing part 7 itself, and converts it into the converted registration number NA1 through the calculation as mentioned above. Further, the processing part 7 fetches the converted password number ND from the converted password number memory part 5 into the processing part 7 itself, and converts it backward into the primarily converted password number NC1 while treating that converted password number ND as the relative address AD and thereby reading the conversion table EX. Thereafter, that primarily converted password number NC1 is converted backward into the card password number NC by using the converted registration number NA1 as mentioned above. Then the processing part 7 fetches the password number N input from RAM by the input keyboard KB into the processing part 7 itself and compares the coincidence and noncoincidence of it with the above-mentioned card password number NC. When coinciding, the green lamp LG is lighted, but when not conciding, the program for preventing the backward read of the password number is executed.

Description will now be made of the program for preventing the backward read of the password number:

When the password number N and the card password number NC do not coincide, the processing part 7 adds the converted password number ND to the above-mentioned password number table NDT. In this case, if the total number of cases to be stored is exceeded, the oldest data is deleted in order to add the present data into the password number table NDT. Next, as regards all of the converted password number (ND1–ND100) being stored in the password number table NDT, the processing part 7 counts the number of cases which coincide with the above-mentioned converted password number ND. When the count value is over a certain decision value H, for example, 20, the processing part 7 deletes the keyword KW having enabled the RAM to store. If the count value is under the decision value H, the power source is turned off after the lapse of a certain time. Accordingly, if the password number is taken wrong 20 times out of the greatest 100 times in respect of a specific magnetic card MC, it exceeds the decision value H, leading to the impossibility to read even when it occurs discontinuously, or even when the mistakes happening continuously at a time is under 4 cases.

The key word KW being once deleted in a manner as mentioned above is able to be written again to be written again by means of a not-open-to-the-public operation. An example of it is shown in FIGS. 7(1), 7(2): At the time of the checking of the above-mentioned key word KW being commenced immediately by the "on" of the start key S, a previously predetermined secret number is input by the ten keys while doing a special key input in case of abnormality, that is, for example, by pushing down at the same time a plurality of specific keys, whereby the key word having been stored in ROM is transferred to RAM and is restored to be workable again.

The above-mentioned invalid numbers memory part 11 inputs the invalid registration number NB by the use of the ten keys of the input keyboard KB in the "ON" state of the mode change-over switch SW. Without a break, the invalid number memory part 11 can store additionally any invalid registration number NB by pushing down the registration key IN. The invalid registration number memory part 11 is further able to read by the use of the card reading part 3 the data card DC as an external memory medium wherein the invalid registration number NB is magnetically recorded, and store it additionally in the invalid number memory part 11. By the way, the data card DC is provided with the magnetic record field 6A–6D which consist of magnetic strips on both sides of the front and back of the card, substrate 2A being longer than the card substrate 2 of the above-mentioned magnetic card MC. This data card DC has a bigger memory capacity than the magnetic card MC. Incidentally, such a type of a data card DC may be made in a mailable shape and in a definite-type envelope. Further, by using the external memory unit consisting of a floppy disk being connected to the above-mentioned data bus BUS, the invalid number memory part 11 has the ability not only to fetch the invalid registration number NB from the floppy disk, but also to replace the whole number.

When the invalid registration number NB stored in RAM is about to overflow, the memory part 12 can increase memory capacity through the gate G, as mentioned above, in order to let the RAM1 store the overflowed invalid registration number NB. Incidentally, the above-mentioned gate G opens only when accessing to the RAM1, thus preventing the abnormal reading of ROM and RAM.

The time displaying keyboard T and the function key F of the input key KB are on the same level as the start key S. The processing part 7 is able to display the year, month, day and the hour, minute, second on the display part DIS by pushing down the time displaying key T in place of the start key S. When the function key F is pushed down, it becomes possible for the data correcting the clock part 16 to be input.

RAM and RAM1 can write or read from the input-/output terminal CN through the cassette interface I2 to RAM and RAM1 by the special key operation directly after connecting the main power source, for example, by pushing up at the same time the function key F, the registration key IN, and "1" or "2" of the ten key representing the business selector code number.

DESCRIPTION OF OPERATION

As understood from the above, there can be confirmed visually the card registration number NA, the full name NM, and the time limit of availability GT, all being displayed by the embossed letters on the visual display field 4 of the card, while the card registration number NA, the converted password number ND, and the time limit of availability GT are magnetically recorded on the card, which marks it difficult to counterfeit such cards.

The card password number NC in this example is recorded after having been converted into the converted password number ND, so that even if the converted password ND has been read, the card password number NC can be prevented from disclosure. Accordingly, the unjust use of a found card or the use of a counterfeit card becomes impossible.

The magnetic card discriminator 1 is able to read the converted password number ND, the card registration number NA, the full name, the time limit of availability GT and other information which has all been recorded on the magnetic card MC by the card reading part 3.

The processing part 7 is able to compare the above-mentioned converted password number ND with the password number N having been input from the input keyboard KB after reconverting converted password number ND, and, in case there is the noncoincidence between ND and N, the processing part 7 is able to actuate the red lamp LR and to let the sound-emitting unit BZ give the alarm signal.

The processing part 7 is further able to compare the above-mentioned card registration number NA with the invalid registration number NB having been stored in the invalid number memory part 11 and, in case there is coincidence between the two, the processing part 7 is able to light the yellow lamp LE, to flash on and off the card registration number NA on the display part DIS, and warn that the card should not be used.

The invalid number memory part 11 is able to store additionally the invalid registration number NB by changing-over the above-mentioned change-over switch SW and by using the input keyboard KB, and further is able to let the invalid registration number NB be stored from the card reading part 3 by using a data card DC.

The magnetic card discriminator 1 is able to store in the password number table NDT of the memory part 12 the converted password number ND which has been decided to be noncoincident in checking the password number, while on the other hand the processing part 7 is able to turn the power source "off" when having detected 5 cases of the same converted password number ND continuously in the above-mentioned password table NDT. Consequently, when the password number N has been input by mistake continuously 5 times, the processing is stopped, but when the right password number is input the next time, processing is able to be continued.

The processing part 7 is able to delete the key word KW being stored in RAM when the converted password number ND stored in table NDT exceeds a certain value H of decision, for example, 20, even if each series in the above-mentioned password number table NDT is of less than 4 cases only, being able to make the subsequent execution of the program unpracticable, and consequently being able to prevent the backward read of the card password number NC with the help of the magnetic card discriminator 1.

The invalid number memory part 11 is able to store additionally the invalid registration number NB by the use of the data card DC, thereby promoting the rapidity of the additional registration job of invalid registration numbers, and preventing input errors. This memory part 11 is further able to additionally store the invalid registration number NB from the input keyboard KB, as well.

When the operation has been finished, then the displaying of the display part DIS, and the alarm 9 is turned off after the lapse of a certain time, whereby the power source is supplied only to parts being low in power consumption, for example, such as the processing part 7, the memory part 12, and the input-output part 13, contributing to power saving.

The above-mentioned processing part 7, the memory part 11, and the input-output part 13 are formed together on one chip, and with such an arrangement, they are able to prevent the reading of the conversion program or the conversion table EX which is stored in the memory part 12.

Figure 9:
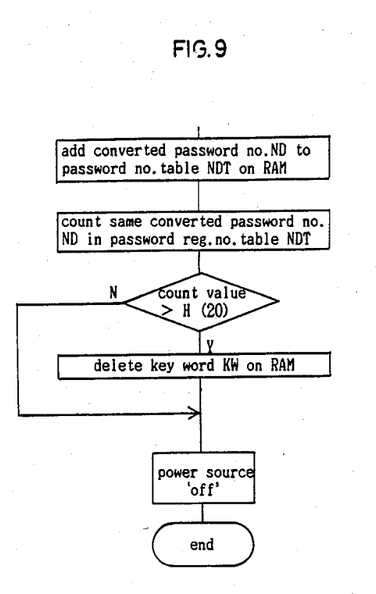

In the magnetic card discriminator 1 according to the invention, the invalid number memory part 11 is mounted on a RAM, floppy disk, magnetic bubble memory, and the like which are all replaceable, and is able to be renewed with the updated invalid registration numbers entirely through replacement. On the other hand, the above-mentioned conversion table EX is stored also in RAM, at the time when the conversion table EX is changed over together with the converted password number of the magnetic card by the use of the data card, the input terminal CN, etc., for example, every year. At that time, it is possible to construct the table so as to store the two kinds of conversion, new and old, and to select either of the two by the use of the time limit of availability GT being stored in the magnetic record field 6. The clock part 16 may be omitted, but at that time, the time data for checking the time limit of availability GT is input by the use of the input keyboard KB and is stored in RAM. As another example for preventing the backward read of the password number, this invention is able to be constructed so as to operate after the lapse of a certain time, for example, several minutes later than the connection of the power source, and that so as to turn the power source "off" when the count value shown in FIG. 9 is over the decision value, for example, 5, or so that the power source can continue in the "on" condition when being under the value 5. With a construction as mentioned above, it takes a long time for the backward read of the password number, which results in the prevention of the backward read.

More than that, the magnetic card discriminator according to the invention can be provided with a connecting terminal for connecting a printing machine which prints, for example, on an accounting slip the magnetic data such as the card registration number NA, the full name of the card owner and the like being recorded on the magnetic card MC. Such a printing machine can be built-in in the interior of the substrate 21. The discriminator is able to be constructed so as to input an amount of money by means of the input keyboard KB and to print that amount on the accounting slip using the above-mentioned printing machine. Still more, an external memory unit like a floppy disk is able to be incorporated in the substrate 21.

Other than the above, the magnetic card discriminator according to the invention can be transformed into many other embodiments.

The effect of the invention

As clearly understood from the reading of the above-described, the magnetic card discriminator according to the invention is provided with a card reading unit which reads the card registration number being magnetically recorded on the magnetic card, a processing part which fetches the card registration number being stored in the registration number memory part, compares that card registration number with the invalid registration number being previously stored in the invalid number memory part, and lets the coincidence and noncoincidence of them output, and an alarm which can operate in response to that output. With such a construction, by way of example, when the card registration number in question has coincided with the invalid registration number, the alarm gives an alarm signal, whereby it becomes possible to easily and quickly discriminate that the very magnet card is not to be used, therewith being able to prevent the unpleasant feeling dealing directly with the customer, and what is better, the discrimination job can be done independently without connecting to the host computer of a magnetic card issuing organization, for example, such as a credit company or a bank. There is no necessity for its use to suffer the restriction of time and place. Into the bargain, it is possible to make this machine small-sized and portable. Seeing like this, there will be a great deal of anticipation in the effect the magnetic card discriminator according to our invention can afford to provide.

What is claimed is:
1. A magnetic card discriminator, comprising:
card reading means for reading a card registration number magnetically recorded on a magnetic card;
registration number memory means for storing said card registration number read by said card reading means;
invalid number memory means for storing previously determined invalid registration numbers as registration numbers of cards not to be used, and being able to store additional invalid registration numbers from an external storage medium containing said additional invalid registration numbers;
processing means for fetching said registration number from said registration number memory means, comparing it with said invalid registration numbers stored in said invalid number memory means, and outputting a signal signifying the coincidence or noncoincidence of the two; and
alarm means connected to said processing means and being activated in response to said signal signifying the coincidence of said comparison;
said card reading means, said card reading means, registration number memory means, invalid number memory means, processing means, and alarm being combined in a single unit.
2. A magnetic card discriminator as set forth in claim 1, wherein said card reading means comprises;
a card passing-through slot where said magnetic card passes through by being manually guided; and
a magnetic head reading said card registration number, disposed within said card passing-through slot.
3. A magnetic card discriminator as set forth in claim 1, wherein said invalid number memory part is provided in a RAM having a backup power source for preserving the contents of memory.
4. A magnetic card discriminator as set forth in claim 1, wherein said external storage medium is a data card magnetically recorded with said additional invalid registration numbers so as to be readable by the use of said card reading means.
5. A magnetic card discriminator as set forth in claim 1, wherein said external storage medium is a floppy disk.
6. A portable magnetic card discriminator for identifying invalid magnetic cards, comprising:
card reading means for reading information including a card registration number magnetically recorded on a magnetic card;
registration number memory means for storing information including said card registration number read by said card reading means;
invalid registration number memory means for storing card registration numbers previously determined to be invalid;
processing means for comparing the card registration number stored in said registration number memory means with the invalid registration numbers stored in said invalid registration number memory means and outputting a signal corresponding to the coincidence or non-coincidence of said card registration number with an invalid registration number;
display means, responsive to said card reading means, for visually displaying the information read from the magnetic card including said card registration number and including a valid display segment activated by a non-coincidence signal from said processing means, and an invalid display segment activated by a coincidence signal from said processing means; and
alarm means responsive to said coincidence signal for audibly indicating the identification of an invalid card;
said magnetic discriminator thus being operable without being on line with a host computer.

7. The portable magnetic card discriminator of claim 6, further comprising:

keyboard means for entering a password number of said magnetic card into a first area of said registration number memory means;

said information read by said card reading means including said password number, said password number read by said card reading means being stored in a second area of said registration number memory means;

said processing means further comparing said password numbers in said first and second areas and outputting a signal corresponding to the coincidence or non-coincidence thereof;

said display means further including an invalid password number display segment activated by a password non-coincidence signal from said processing means.

* * * * *